(12) United States Patent
Mollhagen (10) Patent No.: US 7,699,584 B2
(45) Date of Patent: Apr. 20, 2010

(54) ACTUATOR FOR ADJUSTING A ROTOR BLADE PITCH ANGLE

(75) Inventor: Klaus-Peter Mollhagen, Memmingen (DE)

(73) Assignee: Liebherr-Werk Biberach GmbH, Biberach An Der Rib (DE)

(*) Notice: Subject to any disclaimer, the term of this patent is extended or adjusted under 35 U.S.C. 154(b) by 564 days.

(21) Appl. No.: 11/529,874

(22) Filed: Sep. 29, 2006

(65) Prior Publication Data
US 2007/0081896 A1   Apr. 12, 2007

(30) Foreign Application Priority Data
Oct. 7, 2005   (DE) .................. 20 2005 015 774 U (51) Int. Cl.
*F04D 29/36* (2006.01)

(52) U.S. Cl. ............... 416/146 A; 184/4; 184/6.12

(58) Field of Classification Search ............ 416/146 A, 416/155, 156, 31; 184/4, 6.12, 9, 37
See application file for complete search history.

(56) References Cited

U.S. PATENT DOCUMENTS 1,892,240 A * 12/1932 Knapp ........................ 184/6
4,893,697 A * 1/1990 Tosi ........................... 184/7.4
6,783,326 B2 * 8/2004 Weitkamp et al. ............. 416/1
7,244,097 B2 * 7/2007 Hinz et al. ................. 415/122.1

FOREIGN PATENT DOCUMENTS

DE   200 17 994 U 1    3/2001
DE   200 21 026 U 1    5/2001

* cited by examiner

*Primary Examiner*—Edward Look
*Assistant Examiner*—Ryan H Ellis
(74) *Attorney, Agent, or Firm*—Allston L. Jones; Peters Verny, LLP

(57) ABSTRACT

Actuator for adjusting pitch angle of a rotor blade of a wind turbine rotatably mounted on a rotor hub, comprising a first drive element connectable with the rotor blade, a second drive element in meshing engagement with said first drive element, a lubricating device for lubricating the two drive elements and lubrication controller. A rotor with a rotor hub, on which at least one rotor blade is rotatably mounted, with actuator adjustable pitch angle. A wind turbine comprising such rotor and such actuator. Selective lubrication of zero teeth of the gear stage of the actuator considers the rotary position of the drive elements of the gear stage with respect to each other. The lubricating device includes a lubricant passage to selectively supply portion of first drive element and/or portion of second drive element meshing therewith depending on engagement position of drive elements or rotary position of rotor blade.

22 Claims, 10 Drawing Sheets

ACTUATOR FOR ADJUSTING A ROTOR BLADE PITCH ANGLE

BACKGROUND OF THE INVENTION

1. Field of the Invention

The present invention relates to an actuator for adjusting the pitch angle of a rotor blade of a wind turbine, which is rotatably mounted on a rotor hub, comprising a first drive element connectable with the rotor blade, a second drive element in meshing engagement with said first drive element, as well as a lubricating device for lubricating the two drive elements. The invention furthermore relates to a rotor with a rotor hub, on which at least one rotor blade is rotatably mounted, whose pitch angle can be adjusted by an actuator as mentioned above. Finally, the invention relates to a wind turbine comprising such rotor and such actuator.

2. Description of the Prior Art

Wind turbines regularly employ rotors whose rotor blades are rotatably mounted on the rotor hub, so that the pitch angle of the rotor blades can be adjusted. By means of large roller bearings, the rotor blades can be mounted at the rotor hub so as to be rotatable about their longitudinal axis, so that an actuator accommodated inside the rotor hub can change the pitch angle of the rotor blades. For this purpose, so-called pitch drives are used, as they are disclosed for instance in DE 200 17 994 U1. Preferably, the drive movement of an actuator motor is transmitted to the rotor blade via a gear stage. Advantageously, the rotor blade can be flanged directly onto the inner ring of the large roller bearing, which constitutes a stewing ring and has an internal toothing with which a drive pinion is meshing, which is arranged inside the slewing ring and is seated on a drive shaft.

Of course, the actuators in such rotors of wind turbines must be lubricated. An example for a lubricating device in the rotor of a wind turbine is shown for instance in DE 200 21 026 U1. A lubrication problem arises for instance in that the pitch angle of the rotor blades is not frequently changed, as there is an optimum pitch angle for the rotor blades over a wide wind range, so that the rotor blades actually are only twisted when the wind is too strong or the turbine must be stopped for maintenance purposes. This leads to the fact that the actuators remain in the same position for most of the operating time, and in the gear stage of the actuator always the same pair of teeth of the meshing drive elements is in engagement with each other. The lubricant thereby can be displaced, so that an increased wear occurs at this pair of teeth. The pair of teeth of the stewing ring and of the drive pinion, which is in engagement with each other in the optimum pitch angle position of the rotor blades, often is also referred to as pair of zero teeth or as zero tooth. These zero teeth of the drive elements in the wind turbine rotors gradually suffer from chipping at their tooth flanks and exhibit strong wear after some time. The torques resulting from the attack of wind must always be tolerated at the same point of attack, which is even aggravated by vibrations and oscillations likewise suffered by the tooth engagement.

To avoid these problems it has already been proposed to offset the meshing drive elements with respect to each other after some time, so that in the working position of the rotor blade they are meshing with other teeth. In the case of wind turbines, however, this is not easily possible merely because of the enormous dimensions of the turbine. A disassembly of the rotor blade is extremely time-consuming. Even inside the rotor hub, the actuator cannot easily be repositioned. Therefore, it has already been considered to provide the meshing drive elements with an associated lubricating wheel which meshes with one of the drive elements and transfers lubricant onto the same. From time to time, the actuator is operated, in order to thereby ensure lubrication. However, such design of the lubricating device is very costly. In addition, the pitch angle of the rotor blades must be changed at undesired times.

SUMMARY OF THE INVENTION

Therefore, it is the object underlying the invention to create an improved actuator, an improved rotor and an improved wind turbine as mentioned above, which eliminate the disadvantages of the prior art and develop the latter in an advantageous way. Preferably, the lubricating device should be improved such that the so-called zero-degree teeth in the gear stage of the actuator can sufficiently be lubricated with simple means.

In accordance with the invention, this object is solved by an actuator as, a rotor as well as a wind turbine as as disclosed herein. Preferred aspects of the invention are the subject-matter of the claims.

There is thus proposed a selective lubrication of the zero-teeth of the gear stage of the actuator, which advantageously considers the rotary position of the drive elements of the gear stage with respect to each other. In accordance with the invention, the lubricating device has a lubricant passage for the selective supply of lubricant to the portion of the first drive element and/or the portion of the second drive element meshing therewith, which in the working position of the rotor blade are in engagement with each other, and a supply control means for controlling the supply of lubricant through said lubricant passage in dependence on the engagement position of the two drive elements or the rotary position of the rotor blade. The supply control means ensures that the zero tooth of the first drive element and/or of the second drive element is only lubricated when the two drive elements are in the proper position with respect to each other. In particular, the supply control means can provide that lubrication only is effected when the two zero teeth of the two drive elements actually are in engagement with each other, and lubrication is not effected when, for instance under too strong wind, the rotor blades are turned out of the wind.

For this purpose, the supply control means can have an enabling switch which activates the lubricant supply when said two drive elements are in engagement with those portions with which they are meshing in the working position of the rotor blade, and which blocks the lubricant supply when said two drive element portions are out of engagement. The supply control means arms the lubricant supply, so to speak, which does not mean that lubricant must be supplied constantly when the rotor blades are in their working position and the zero teeth are in engagement with each other. A time pulse control, a time sequence control or the like can of course be superimposed on said principal activation of the lubricant supply, so that lubricant is supplied for instance in predetermined intervals, but only when the zero teeth actually are in engagement with each other.

For controlling the supply of lubricant, the aforementioned lubricant passage can in particular include a valve, which can be disposed in particular in the orifice region of the lubricant passage. The valve advantageously is designed such that it can be actuated in dependence on the engagement position of the two drive elements to be lubricated, and is opened in particular when the drive element portions to be lubricated are in engagement with each other, and is closed when these two drive element portions are out of engagement.

In accordance with a preferred embodiment of the invention, the valve can include a mechanical valve opener, which is movable between an opening position and a closing position and protrudes in the vicinity of the orifice of the lubricant passage, so that it will open the valve by being depressed. In particular, the valve opener is disposed on the one drive element such that it is actuated by the other drive element, when said other drive element meshes with the corresponding portion of the first-mentioned drive element.

Instead of such mechanical valve opener, which is actuated by the engagement portion to be lubricated of one of the two drive elements, an electronic or hydraulic valve control might also be provided, for instance such that the rotary position of the rotor blade and/or the engagement position of the drive elements is detected by means of a sensor and in response thereto, the valve is actuated by a correspondingly designed control means. The aforementioned embodiment of the valve with a mechanical valve opener is, however, much easier to provide and operates completely without failure, as the valve necessarily is actuated when the drive elements are meshing with each other with their zero teeth. Preferably the valve opener is actuated by one of the zero teeth of the drive elements.

In accordance with an advantageous embodiment of the invention a shut-off valve, possible in the form of a check valve, can be provided in the lubricant passage, which valve is closed by the lubricant pressure existing in the lubricant passage. The valve opener is provided at the shut-off member and extends out of the orifice of the lubricant passage, so that the shut-off member will open against the lubricant pressure by depressing the valve opener.

In principle, the lubricant passage can be passed in various ways to the portions or sectors of the drive elements to be lubricated. When the gear stage to be lubricated is formed by a drive pinion and a slewing ring connectable with the rotor, a particularly advantageous embodiment of the invention consists in that the lubricant passage is passed through the drive pinion and opens at the zero tooth thereof, wherein the orifice can be provided in the vicinity of a tooth base, but also in the vicinity of a tooth tip. An orifice in the vicinity of the tooth base is preferred, as in this case the tooth itself is not weakened by the lubricant bore.

Preferably, the lubricant passage in the drive pinion extends radially to the outside and opens in the vicinity of the tooth base of that tooth which in the working position of the rotor blade meshes with a tooth of the stewing ring. The lubricant passage is supplied with lubricant from a lubricant port which communicates with the lubricant passage via a central rotary joint inside the drive pinion. Preferably, the lubricant port can be provided on the end face of the drive pinion. Alternatively, the lubricant passage can also be passed into the drive shaft on which the drive pinion is seated. In this case, the lubricant port can advantageously be seated on a drive shaft bearing housing, so that lubrication is effected through a bearing portion of the drive shaft. The lubricant is pressed into the bearing housing, so to speak, where it can lubricate the drive shaft bearings, and enters the drive shaft, in which the lubricant is selectively passed through the aforementioned lubricant passage onto the zero tooth to be lubricated.

Alternatively or in addition to a supply of lubricant through the drive pinion, the supply of lubricant can also be effected through the stewing ring. In this case, the lubricant passage preferably extends radially through the slewing ring and opens in the vicinity of the zero tooth of the toothing of the stewing ring, which in the preferred working position of the rotor blade is in engagement with the drive pinion. Here as well, the orifice region of the lubricant passage can in principle be arranged both in the vicinity of the tooth base and in the vicinity of the tooth tip, but here as well an orifice in the vicinity of the tooth base is preferred for the above reasons.

If, in accordance with an advantageous embodiment of the invention, the slewing ring forms a bearing ring of a large roller bearing, by means of which the rotor blade is mounted on the rotor hub, the lubricant passage preferably is also passed through the second bearing ring of the large roller bearing on which the slewing ring is supported. Here, the lubricant supply can be passed through the rolling member cage, so that the rolling members of the large roller bearing are lubricated at the same time. A particular embodiment can also consist in that the lubricant passage is passed through the two bearing rings such that the two portions of the passage only communicate with each other when they overlap each other in a certain position of the bearing rings with respect to each other. As a result, the valve described above can possibly be omitted. When the lubricant passage is passed through the outer bearing ring such that it only communicates with the portion of the lubricant passage in the inner bearing ring when the rotor blade is in the preferred working position, the supply of lubricant is controlled automatically, so to speak.

Alternatively or in addition to such supply of lubricant through the rotor blade bearing, the lubricant can also be supplied to the meshing pair of drive elements laterally or via the end face. For this purpose, the lubricant passage can extend for instance through a wall of the rotor hub or in particular through the drive shaft bearing housing and can have an orifice which is located on the end face of the engagement portion of the two meshing drive elements of the gear stage. If there is provided a valve with a protruding valve opener in the lubricant passage, as described above, an actuator can be provided at the zero tooth to be lubricated of the one or other drive pinion, for instance in the form of a protruding actuating cam, which depresses the valve opener and thereby activates the supply of lubricant, when the zero teeth of the two drive elements are in the engagement position.

The present invention relates to an actuator for adjusting the pitch angle of a rotor blade of a wind turbine, which is rotatably mounted on a rotor hub, comprising a first drive element connectable with the rotor blade, a second drive element in meshing engagement with said first drive element, as well as a lubricating device for lubricating the two drive elements. The invention furthermore relates to a rotor with a rotor hub, on which at least one rotor blade is rotatably mounted, whose pitch angle can be adjusted by an actuator as mentioned above. Finally, the invention relates to a wind turbine comprising such rotor and such actuator. There is proposed a selective lubrication of the zero teeth of the gear stage of the actuator, which advantageously considers the rotary position of the drive elements of the gear stage with respect to each other. In accordance with the invention, the lubricating device includes a lubricant passage for the selective supply of lubricant to the portion of the first drive element and/or the portion of the second drive element meshing therewith, which are in engagement with each other in the working position of the rotor blade, as well as a supply control means for controlling the supply of lubricant through said lubricant passage in dependence on the engagement position of the two drive elements or the rotary position of the rotor blade. The supply control means ensures that the zero tooth of the first drive element and/or of the second drive element only is lubricated when the two drive elements are in the proper position for this purpose. In particular, the supply control means can provide that lubrication only is effected when the two zero teeth of the two drive elements actually are in engagement with each other and lubrication is not effected when, for instance under too strong wind, the rotor blades are turned out of the wind.

BRIEF DESCRIPTION OF THE DRAWINGS

The invention will subsequently be described in detail with reference to preferred embodiments and associated drawings, in which.

DETAILED DESCRIPTION OF THE INVENTION

Figure 1:
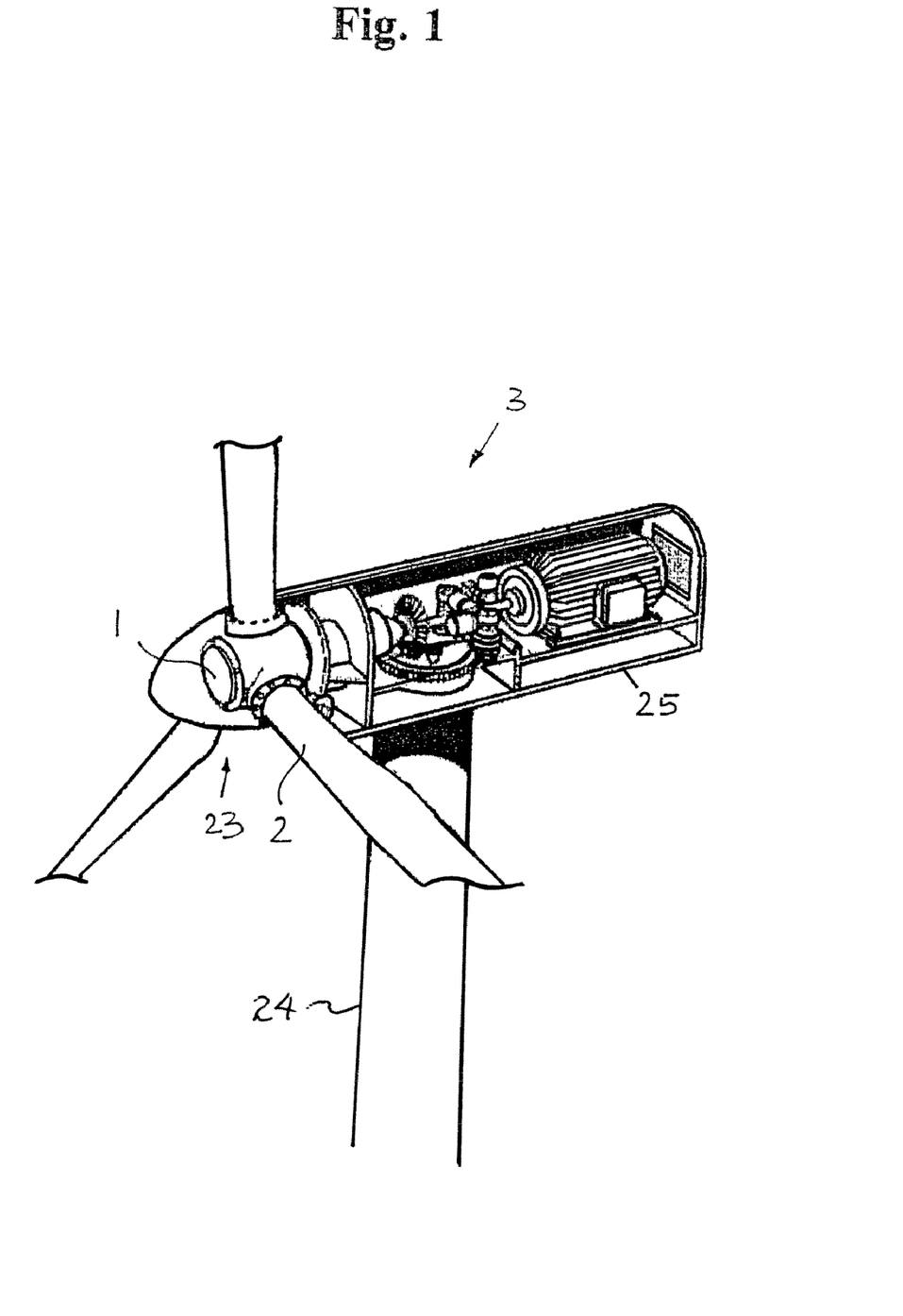
FIG. 1 is a partial perspective view of a wind turbine, which shows a partial section of the nacelle of the wind turbine, which is mounted on a tower, and the rotor mounted thereto including the rotor blades.
Figure 2:
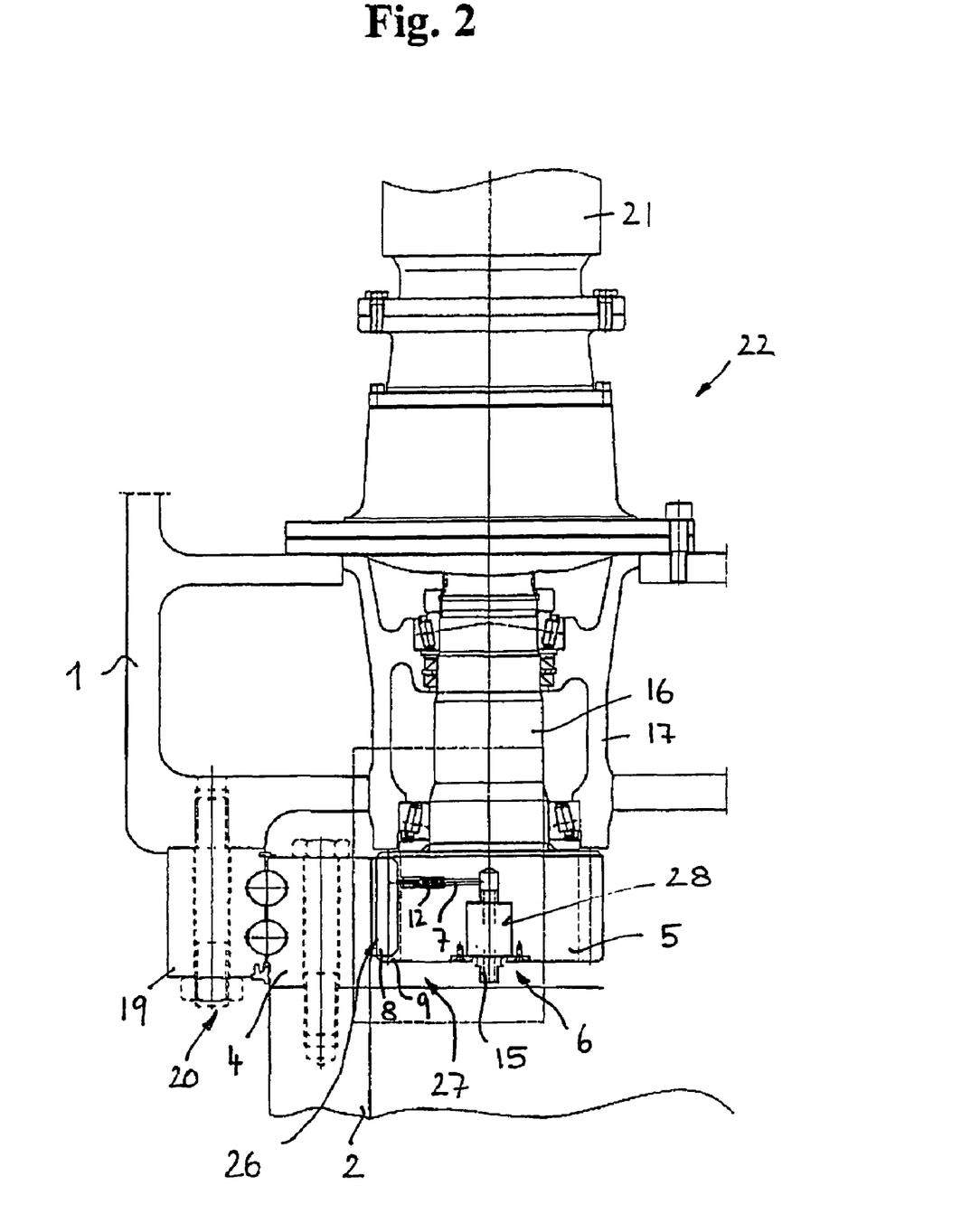
FIG. 2 is a section through the actuator arranged in the rotor hub of the wind turbine of FIG. 1, which serves to adjust the pitch angle of the rotor blades of the wind turbine of FIG. 1, in which the zero teeth of the gear stage are lubricated by a supply of lubricant through the drive pinion.

In a manner known per se, the wind turbine 3 schematically shown in FIG. 1 comprises a nacelle 25 mounted on mast or tower 24 so as to be rotatable about an upright axis, on which nacelle the rotor 23 is rotatably mounted about a horizontal axis, in order to drive a generator. In a manner known per se, the rotor 23 comprises a rotor hub 1, which is rotatably mounted about said horizontal axis and carries a plurality of rotor blades 2 (three in the illustrated embodiment), which are mounted on the rotor hub 1 so as to radially protrude therefrom. The rotor blades 2 can be twisted about their longitudinal axis relative to the rotor hub 1, so that the pitch angle of the rotor blades 2 can be varied. For this purpose, an actuator 22 is provided for each of the rotor blades 2 inside the rotor hub 1, as is shown in FIG. 2. The actuator 22 comprises an actuator motor 21, which can constitute an electric motor and is flanged to a wall of the rotor hub 1 (cf. FIG. 2). Via a drive shaft 16, the actuator motor 21 drives a drive pinion 5 seated on the end face of the drive shaft 16, the axes of rotation of the drive shaft 16 and of the drive pinion 5 being arranged parallel to the adjustable rotor blade axis.

The respective rotor blade 2 is attached to the rotor hub 1 via a large roller bearing 20. In the illustrated embodiment, the outer bearing ring 19 of the roller bearing 20 is flanged to the rotor hub 1 and fastened there by means of screws, as shown in FIG. 2. The inner, rotatable bearing or slewing ring 4 of the roller bearing 20 carries the rotor blade 2, which is flanged to the end face of the bearing ring 4 and is likewise fixed thereto by means of screws.

Said slewing ring 4 of the bearing 20 includes internal toothing 26, which meshes with the aforementioned drive pinion 5. When the drive pinion 5 is rotated by the actuator motor 21, this is translated into a corresponding change of the pitch angle of the rotor blade 2.

As is furthermore shown in FIG. 2, the drive shaft 16 of the actuator 22 is supported on the rotor hub 1 via a drive shaft bearing housing 17. As shown in FIG. 2, the drive shaft 16 is suitably supported on the drive shaft bearing housing 17 via roller bearings.

For lubricating the gear stage 27 formed by the drive pinion 5 and the stewing ring 4, a lubricating device 6 is provided, by means of which lubricant can selectively be supplied onto the zero teeth of the drive pinion 5 and of the stewing ring 4. These so-called zero teeth 8 and 9 are teeth of the drive pinion 5 and of the slewing ring 4, which are in engagement with each other when the rotor blade 2 has been rotated into its optimum pitch angle position for normal wind conditions.

Figure 3:
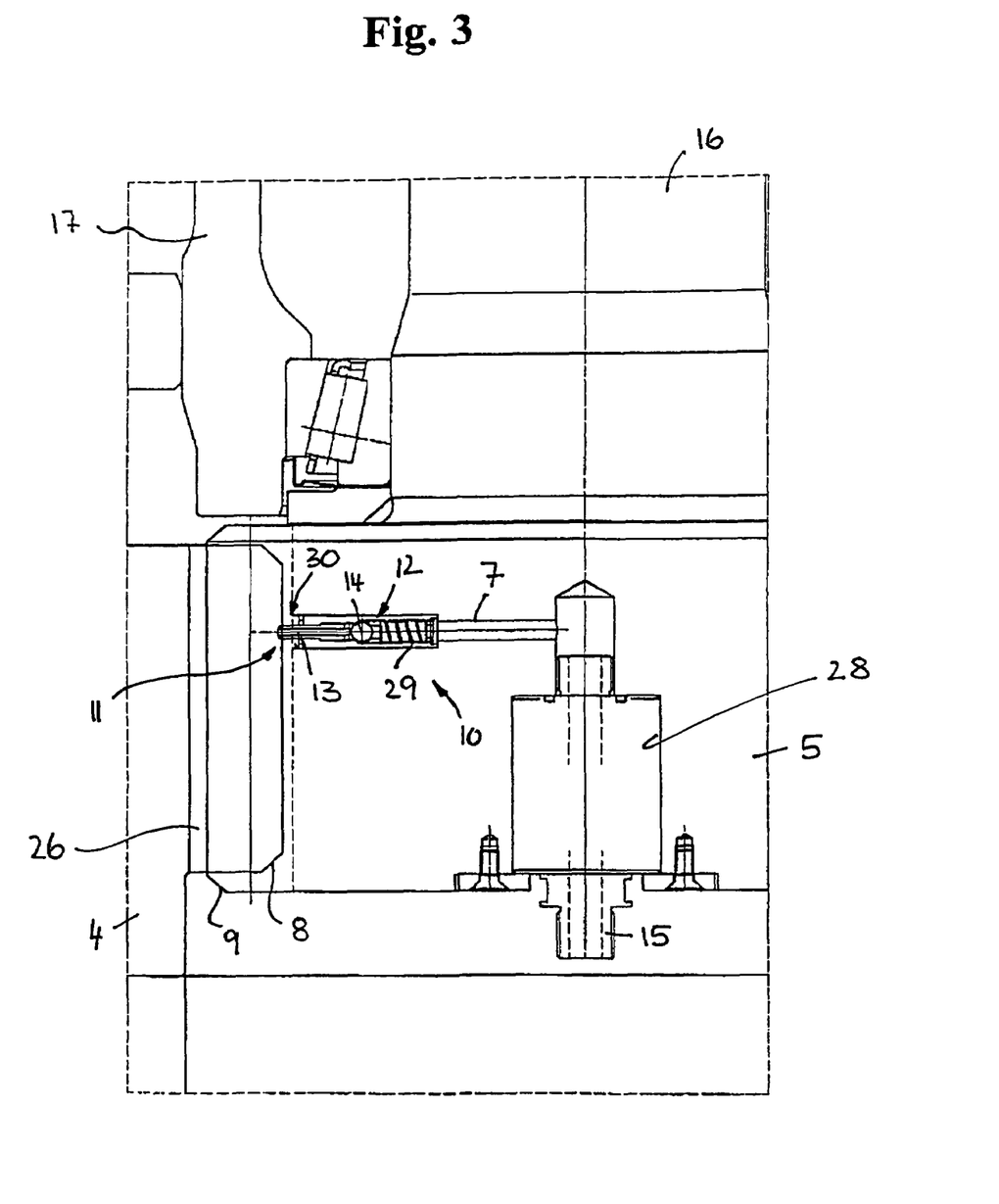
FIG. 3 is an enlarged representation of the lubricant passage and the valve disposed therein, in the drive pinion of the actuator of FIG. 2.
Figure 10:
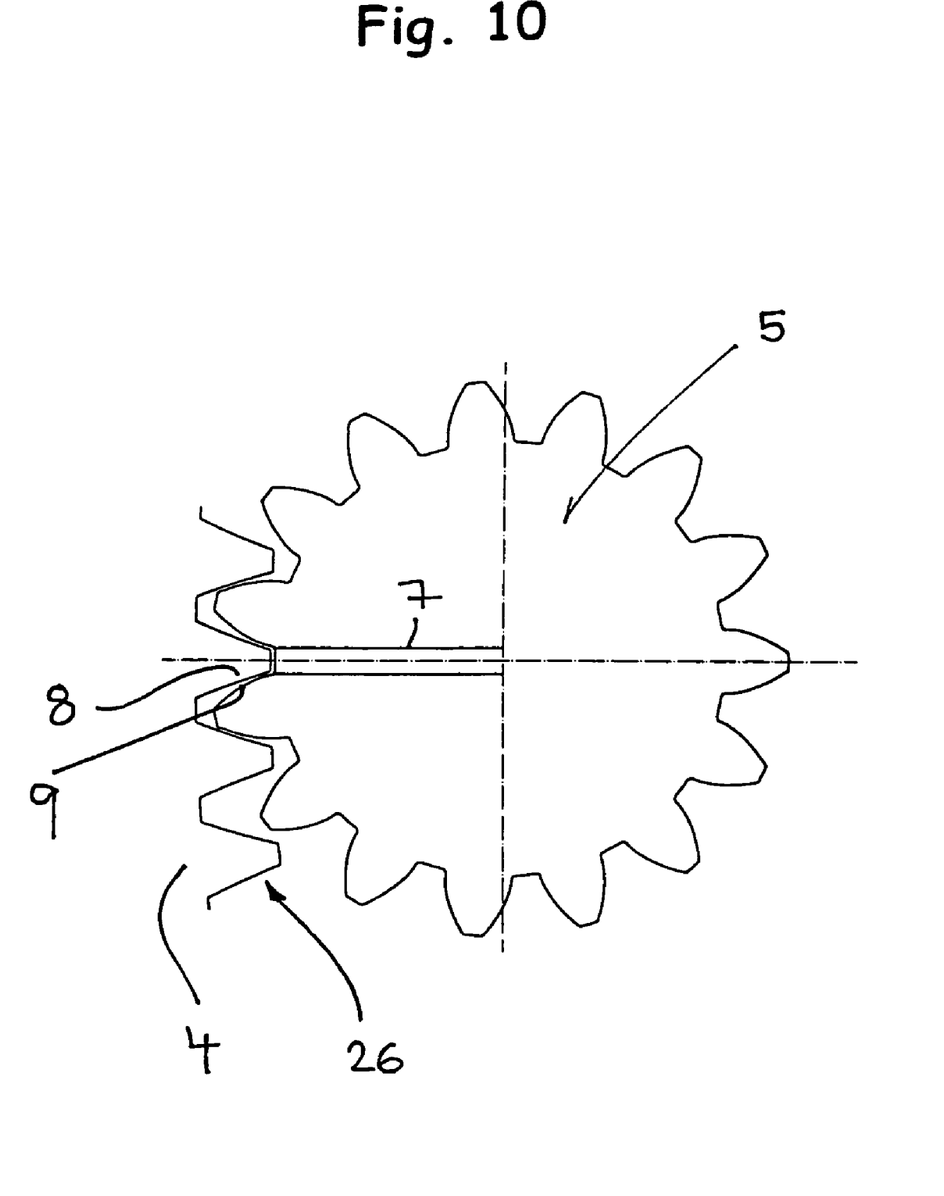
FIG. 10 is a cross-section through the drive pinion with incorporated lubricant passage, for instance as shown in FIG. 2, which shows the orifice of the lubricant passage in the tooth base.

In the embodiment shown in FIGS. 2 and 3, the lubricating device 6 comprises a lubricant port 15 provided on the end face of the drive pinion 5, which via a rotary joint 28, which coaxially extends into the drive pinion 5, communicates with a lubricant passage 7 which inside the drive pinion 5 extends radially to the outside. The lubricant passage 7 opens in the vicinity of the tooth base of the aforementioned zero tooth, as is shown in FIG. 10.

The supply of lubricant via the lubricant passage 7 is controlled by a supply control means 10, which via an enabling switch 11 activates the supply of lubricant whenever the zero teeth of the drive pinion 5 and of the slewing ring 4 are in engagement with each other or the rotor blade 2 assumes its optimum pitch angle position. In concrete terms, a valve 12 is therefore provided in the lubricant passage 7, which in the manner of a check valve comprises a shut-off member 14, which is biased into its closing position via a spring 29 (cf. FIG. 3), the valve body 14 closing the valve when it is moved towards the orifice 30 of the lubricant passage 7.

For opening the valve 12, a valve tappet is provided as valve opener 13, which has a rod-shaped design and extends away from the valve body 14 through the lubricant passage 7 up to the orifice 30 thereof. As shown in FIG. 3, the valve tappet 13 slightly protrudes beyond the orifice 30 of the lubricant passage 7 in the vicinity of the tooth base of the drive pinion 5, so that the valve 12 is opened by depressing the valve tappet 13, i.e. the valve body 14 is urged from its closing position against the spring force into the opening position. This will occur whenever the zero tooth 8 of the slewing ring 4 meshes with the zero tooth 9 of the drive pinion 5, i.e. engages in the corresponding tooth base region of the drive pinion 5, as is shown in FIG. 10.

Figure 4:
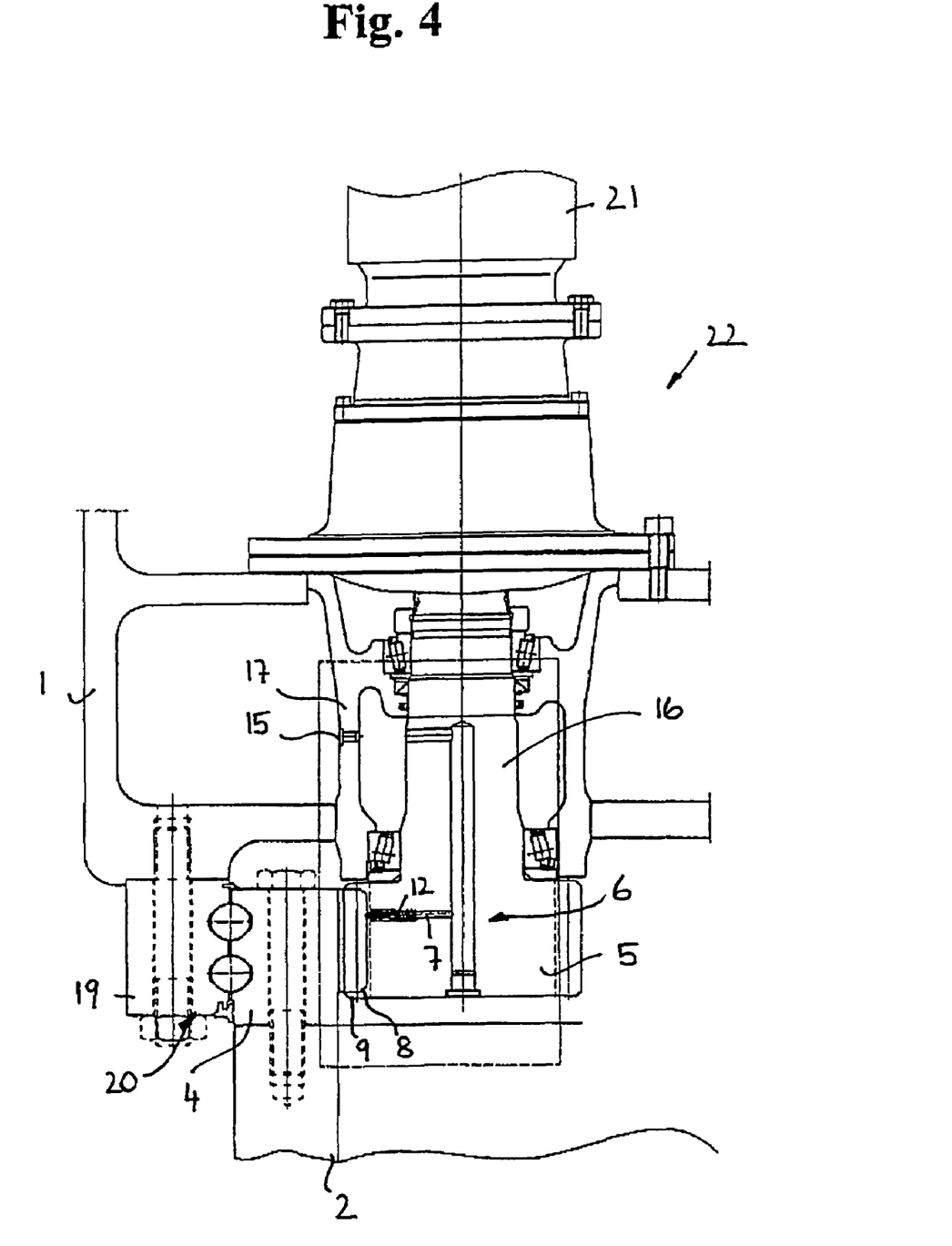
FIG. 4 is a section through the actuator for adjusting the rotor blade pitch angle in accordance with a further embodiment of the invention, in which a lubricant passage in the drive pinion is supplied with lubricant via a lubricant passage in the drive shaft and through a drive shaft bearing housing.
Figure 5:
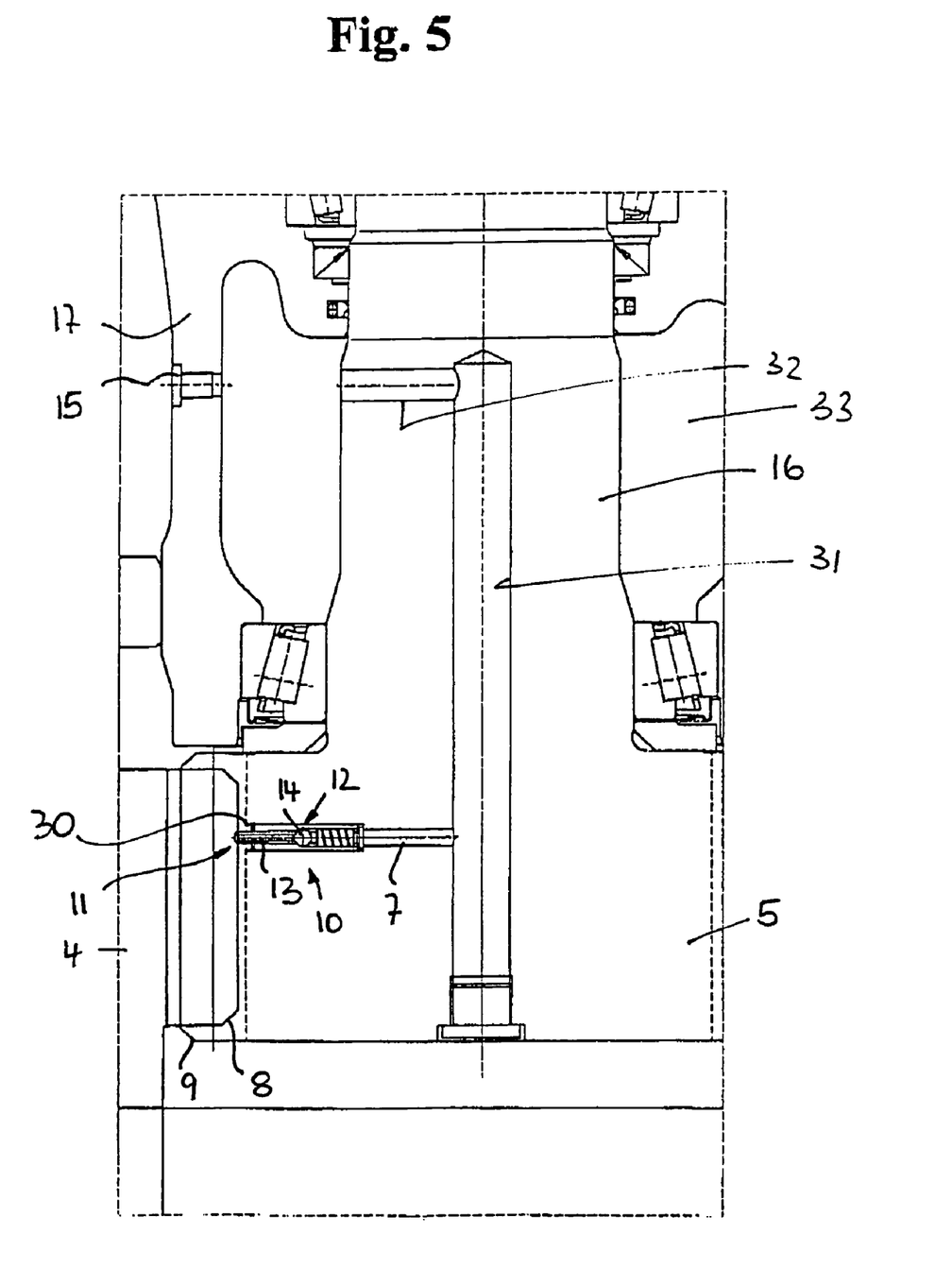
FIG. 5 is an enlarged sectional view of the drive shaft and of the drive shaft bearing housing of FIG. 4, which shows the supply of lubricant via the drive shaft.

FIGS. 4 and 5 basically show a similar embodiment of the lubricating device 6. Here as well, the supply of lubricant is effected through the drive pinion 5 via a lubricant passage 7 radially formed here. In so far, corresponding reference numerals were used for corresponding components. In contrast to the embodiment described above, however, the supply of lubricant is not effected from the end face of the drive pinion 5, but through the drive shaft 16 from a lubricant port 15 provided at the drive shaft bearing housing 17. As shown in FIGS. 4 and 5, the radial lubricant passage 7 communicates with an axial lubricant bore 31 inside the drive shaft 16, which at its end facing away from the drive pinion 5 is passed out of the drive shaft 16 through the radial bore 32, where it opens into a drive shaft bearing housing interior 33. From the outside of the drive shaft bearing housing 17 lubricant can be pressed through the lubricant port 15 into said interior 33, so that the bearings of the drive shaft 16 are lubricated at the same time. In the interior 33, there are also arranged the bearings for the drive shaft 16. The radial bore 32 communicates with this interior and hence allows a supply of lubricant into the lubricant passage 7 and through the same to the zero teeth 8 and 9.

As shown in FIG. 5, the lubricant bore 31 can be incorporated via the end face of the drive shaft 16 and can be closed there by means of a plug.

Figure 6:
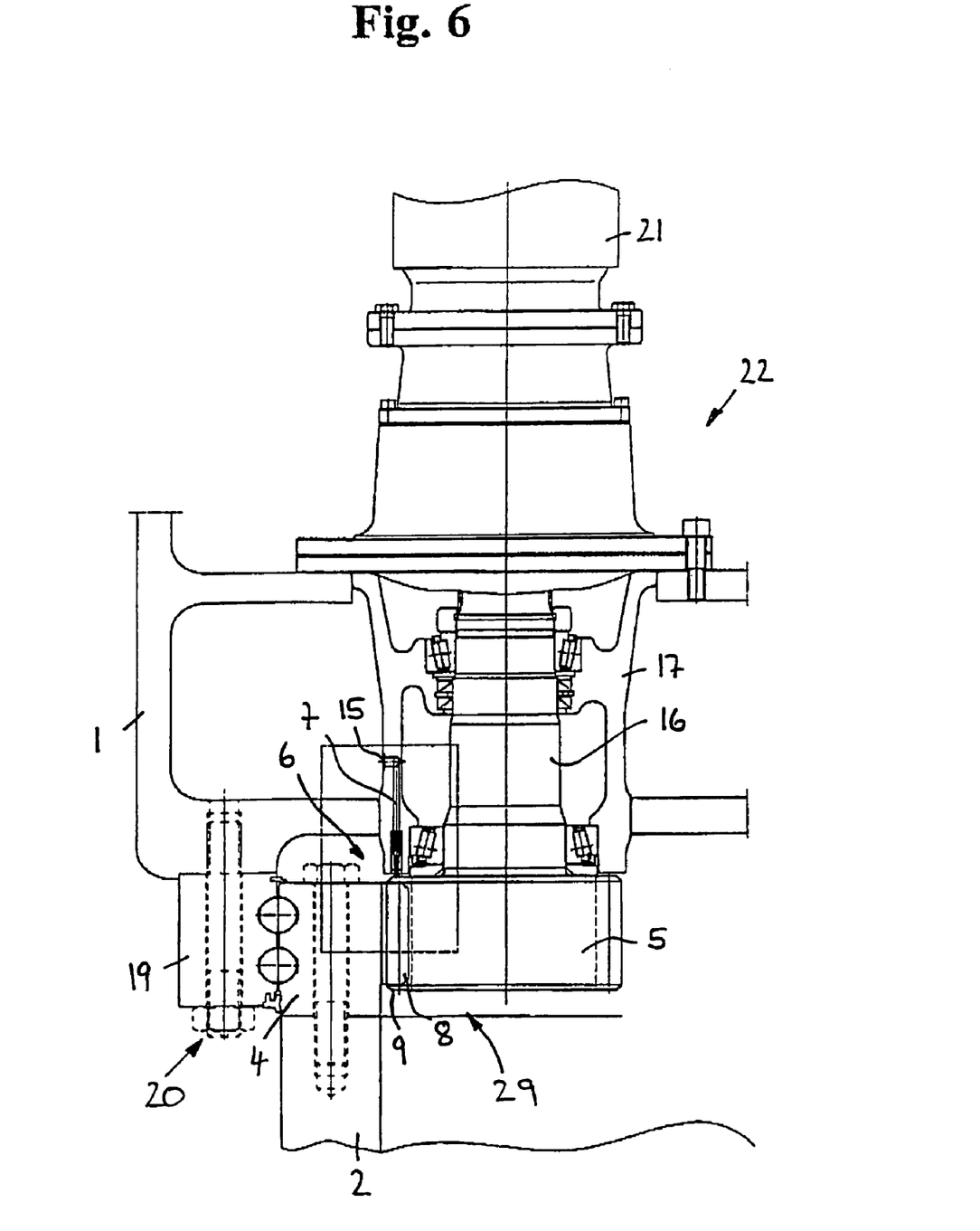
FIG. 6 is a section of an actuator for adjusting the rotor blade pitch angle in accordance with a further preferred embodiment of the invention, in which the zero teeth of the gear stage to be lubricated are lubricated via a lubricant passage in the drive shaft bearing housing and the lubricant is supplied via the end face onto the drive pinion and the slewing ring meshing therewith.
Figure 7:
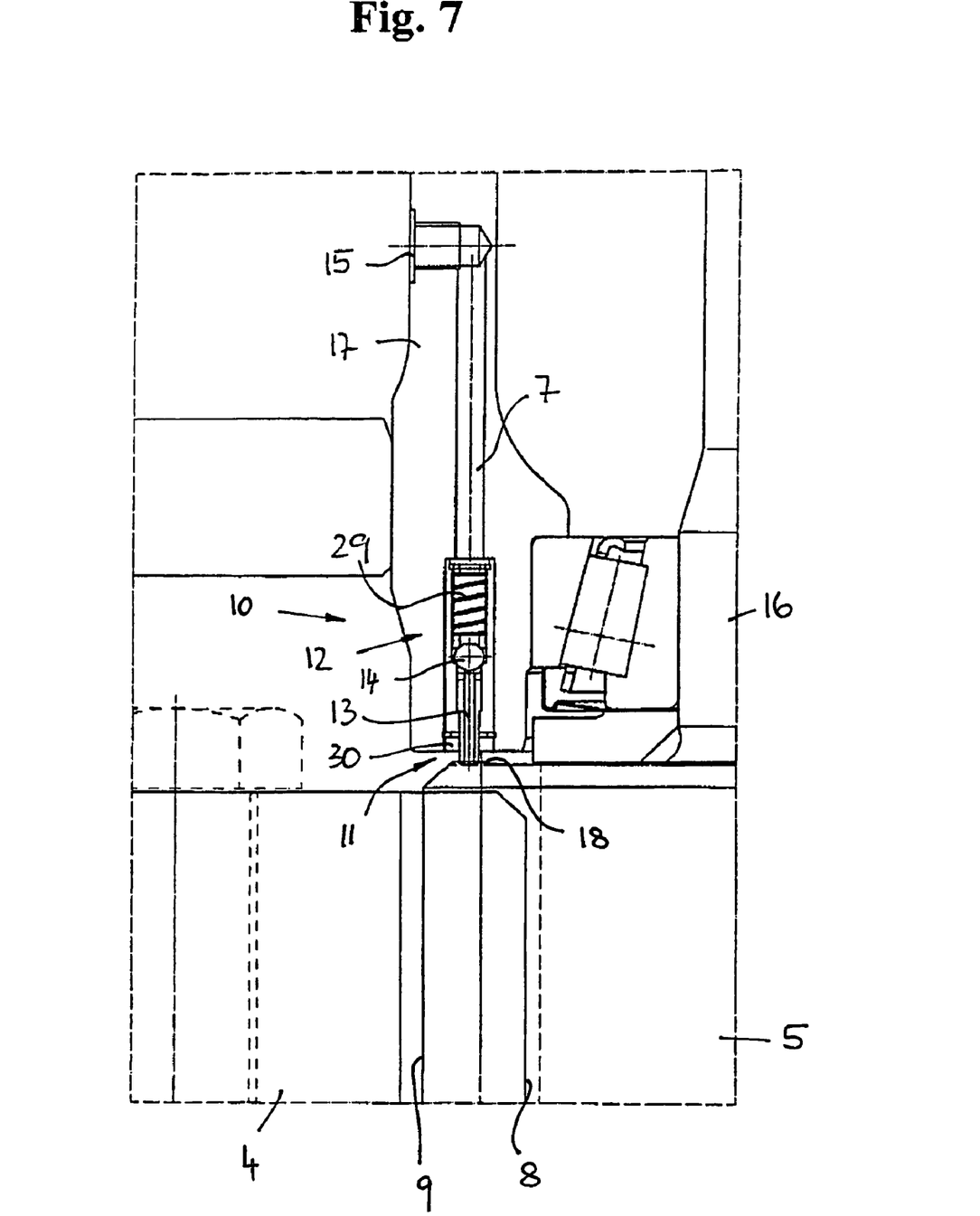
FIG. 7 is an enlarged sectional view of the lubricant passage and the valve disposed therein, in the drive shaft bearing housing of FIG. 6.

Instead of the supply of lubricant through the drive pinion 5 as performed in the preceding Figures, the lubricant can also be supplied from the outside via the end face onto the meshing zero teeth 8 and 9 of the stewing ring 4 or the drive pinion 5. Such an embodiment is shown in FIGS. 6 and 7. In the embodiment illustrated here, the lubricant passage 7 extends in the drive shaft bearing housing 17, in which the drive shaft 16 is accommodated. The lubricant passage 7 extends substantially parallel to the axis of rotation of the drive pinion 5 or the drive shaft 16 and opens onto the engagement portion, in which the drive pinion 5 meshes with the slewing ring 4. The orifice 30 is provided at the end face of the drive shaft bearing housing 17 and is covered by the teeth of the drive pinion 5.

In the embodiment as shown in FIG. 6, the lubricant passage 7 also includes the above-described valve arrangement with the protruding valve tappet 13. In order to open the valve 12, however, only when the above-described zero teeth 9 and 8 of the drive pinion 5 and of the slewing ring 4 are meshing with each other, the zero tooth 9 of the drive pinion 5 carries a protrusion on its end face, which forms an actuating cam 18, by means of which the valve tappet 13 is depressed and the valve 12 is opened. The other teeth of the drive pinion 5 do not carry such actuating cam 18, so that the valve 12 will only open when the zero teeth 8 and 9 are meshing with each other and accordingly lie at the orifice of the lubricant passage 7.

Figure 8:
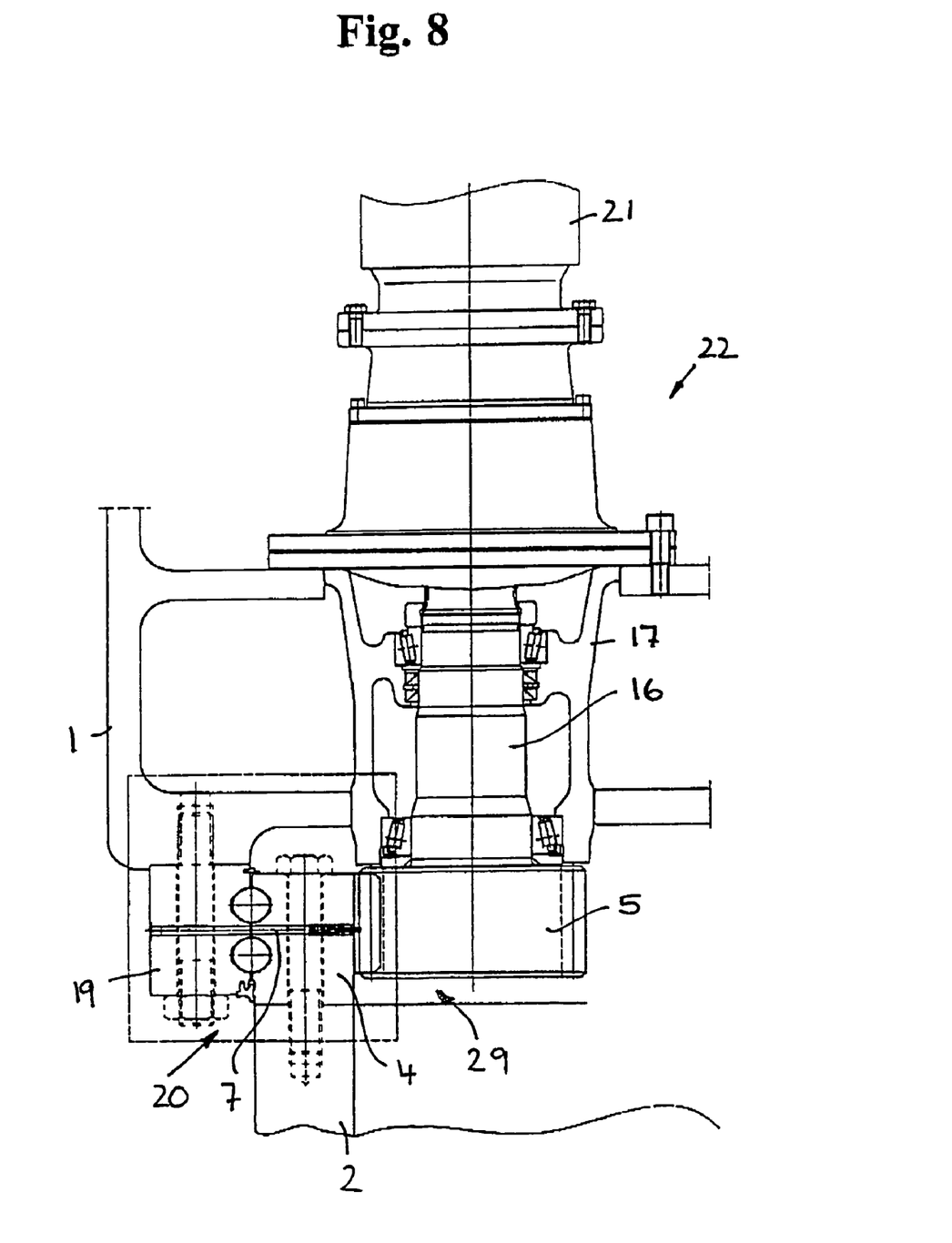
FIG. 8 is a section of an actuator for adjusting the rotor blade pitch angle in accordance with a further embodiment of the invention, in which the zero teeth of the gear stage to be lubricated are lubricated via a lubricant passage through the large roller bearing carrying the rotor blade.
Figure 9:
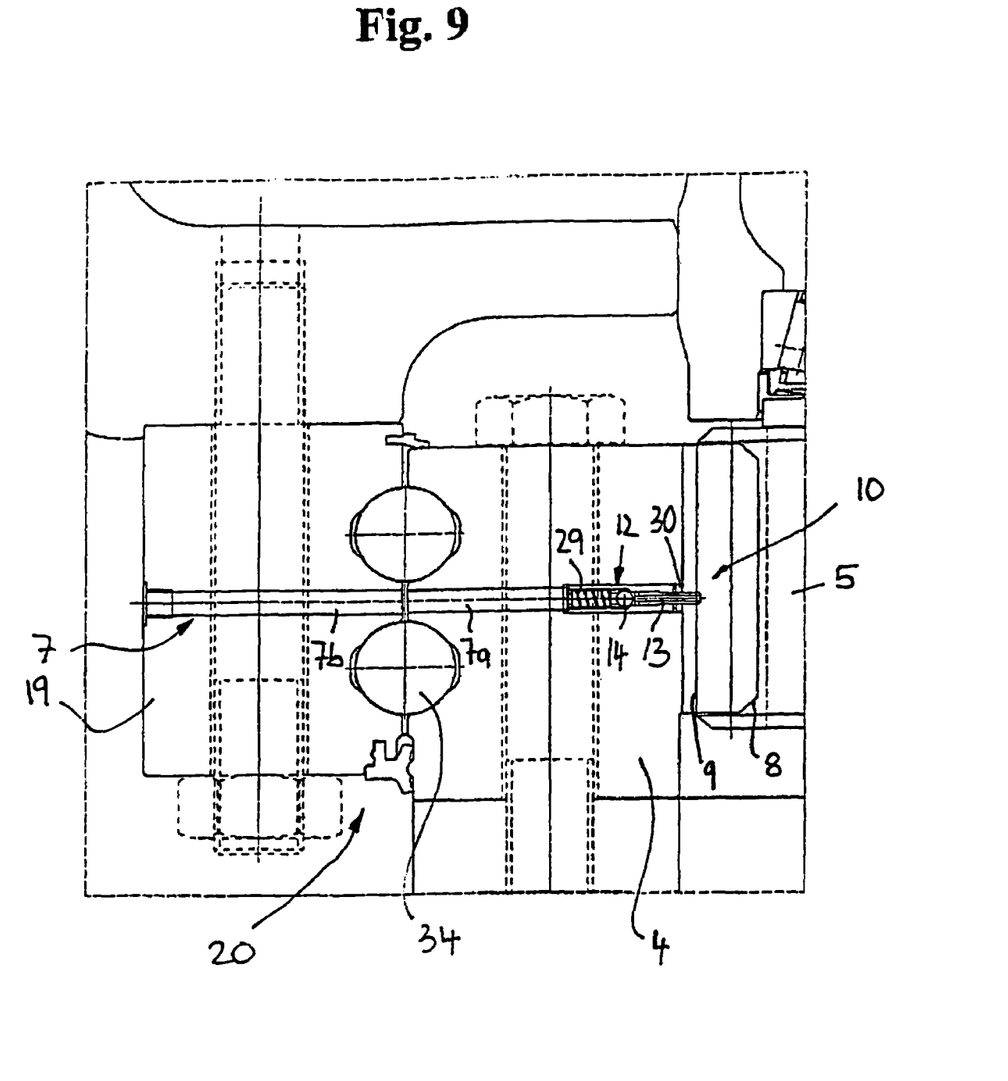
FIG. 9 is an enlarged sectional view of the lubricant passage through the bearing rings of the roller bearing of FIG. 8.

Another embodiment of the lubricating device 6 is shown in FIGS. 8 and 9, and here as well the same reference numerals are used as in the preceding embodiments for corresponding components. The supply of lubricant is effected through the rotary bearing 20 and in particular through the slewing ring 4. The lubricant passage 7 radially extends through the two bearing rings 19 and 4 and opens into the tooth base of the zero tooth 8 of the slewing ring 4, the valve 12 here also being provided with the protruding valve opener 13 in a corresponding manner. It is interesting here that the lubricant passage 7 is divided into the portions 7a and 7b, which are formed on the one hand in the slewing ring 4 and on the other hand in the stationary bearing ring 19. Therefore, the supply of lubricant only is possible when the lubricant passage portions 7a and 7b come to overlap each other and are aligned with each other, which always is the case when the slewing ring 4 assumes the position in which its zero tooth 8 is meshing with the zero tooth 9 of the drive pinion 5, i.e. the rotor blade 2 is in its optimum pitch angle position. In this embodiment, the valve 12 could possibly even be omitted, as in other positions the two passage portions 7a and 7b are not in alignment, and in so far no supply of lubricant can be effected. For this purpose, the transition from the stewing ring 4 to the bearing ring 19 in the vicinity of the passage portions 7a and 7b should be sealed correspondingly. On the other hand, said transitional region advantageously is provided in the vicinity of the rolling members 34 of the bearing 20, so that a lubrication of the rolling members 34 can be achieved via the bearing gap between the two bearing rings.

What is claimed is:

1. An actuator for adjusting the pitch angle of a rotor blade (2) of a wind turbine (3), which is rotatably mounted on a rotor hub (1), comprising a first drive element (4) connectable with the rotor blade (2), a second drive element (5) in meshing engagement with said first drive element (4), as well as a lubricating device (6) for lubricating the two drive elements (4, 5), characterized in that the lubricating device (6) has a lubricant passage (7) for the selective supply of lubricant directly to at least one of a portion (8) of the first drive element (4) and a portion (9) of the second drive element (5), when portions (8, 9) are in engagement with each other when the rotor blade (2) is in its preferred working position, and a supply control means (10) for controlling the supply of lubricant through said lubricant passage (7) in dependence on the engagement position of the two drive elements (4, 5).

2. The actuator as claimed in claim 1, wherein the supply control means (10) includes an enabling switch, which activates the supply of lubricant through the lubricant passage (7) when portions (8, 9) of said two drive elements (4, 5) are in engagement with each other, and which blocks the supply of lubricant through the lubricant passage (7) when said two portions (8, 9) are out of engagement.

3. The actuator as claimed in 1, wherein the supply control means (10) includes a valve (12) in the lubricant passage (7), in particular at the orifice region thereof, which can be actuated in dependence on the engagement position of the two drive elements (4, 5) and/or in dependence on the pitch angle of the associated rotor blade.

4. The actuator as claimed in 3, wherein the valve (12) constitutes a check valve whose shut-off member (14) is actuated towards the closing position of the valve by the lubricant pressure in the lubricant passage (7).

5. The actuator as claimed in claim 1, wherein the lubricant passage (7) opens into a tooth base region of the first and/or second drive element (4, 5).

6. The actuator as claimed in claim 1, wherein the lubricant passage (7) is passed through the second drive element (5) and/or the supply control means (10, 12) is arranged in the second drive element (5).

7. The actuator as claimed in claim 6, wherein the lubricant passage (7) can be brought into a flow connection with a lubricant port (15) disposed on the end face of the second drive element (5).

8. The actuator as claimed in claim 6, wherein the lubricant passage (7) can be brought into a flow connection with a lubricant port (15) provided on a drive shaft (16) and/or a drive shaft housing (17).

9. The actuator as claimed in claim 8, wherein the lubricant passage (7) is passed through a drive shaft (16) and communicates with a drive shaft housing interior, in which bearings are accommodated for supporting the drive shaft (16).

10. The actuator as claimed in claim 1, wherein the lubricant passage (7) is passed through a drive shaft bearing housing (17) or through the rotor hub (1) and opens on the end face onto the toothing of the two drive elements (4, 5).

11. The actuator as claimed in claim 10, wherein for at least on one of said portions (8, 9) of the two drive elements (4, 5) an actuating cam (18) is provided for opening the valve (12).

12. The actuator as claimed in claim 1, wherein the lubricant passage (7) is passed through the first drive element (4) and/or a bearing portion (19) supporting the first drive element (4).

13. The actuator as claimed in claim 12, wherein the lubricant passage (7) is passed through the first drive element (4) and the bearing ring (19) such that the corresponding lubricant passage portions (7a, 7b) are in flow connection with each other only in one rotary position of the first drive element (4) relative to the bearing portion (19).

14. The actuator as claimed in claim 1, wherein the first drive element (4) is a slewing ring and the second drive element (5) is a drive pinion extending inside the slewing ring.

15. The actuator as claimed in claim 14, wherein the second drive element (5) is seated on a drive shaft which is connectable with an actuator motor (21) and/or forms the motor shaft thereof.

16. A rotor for a wind turbine (3) comprising an actuator (22) as claimed in claim 1.

17. The rotor as claimed in claim 16, wherein the rotor blade (2)) is seated on an internally toothed slewing ring (4) of a roller bearing (20) supported on the rotor hub (1), and can be driven by a drive pinion (5) arranged coaxially with the roller bearing (20), which is seated on a drive shaft (16) supported on the rotor hub (1) via a drive shaft bearing housing (17).

18. An actuator for adjusting the pitch angle of a rotor blade (2) of a wind turbine (3), which is rotatably mounted on a rotor hub (1), comprising a first drive element (4) connectable with the rotor blade (2), a second drive element (5) in meshing engagement with said first drive element (4), as well as a lubricating device (6) for lubricating the two drive elements (4, 5), characterized in that the lubricating device (6) has a lubricant passage (7) for the selective supply of lubricant to the portion (8) of the first drive element (4) and/or the portion (9) of the second drive element (5), which are in engagement with each other when the rotor blade (2) is in its preferred working position, and a supply control means (10) for controlling the supply of lubricant through said lubricant passage (7) in dependence on the engagement position of the two drive elements (4, 5);

wherein the supply control means (10) includes a valve (12) in the lubricant passage (7), in particular at the orifice region thereof, which can be actuated in dependence on the engagement position of the two drive elements (4, 5) and/or in dependence on the pitch angle of the associated rotor blade; and wherein the valve (12) includes a valve opener (13) which is movable between an opening position and a closing position and protrudes in the vicinity of the orifice of the lubricant passage (7).

19. The actuator as claimed in claim 18, wherein the valve opener (13) includes a valve tappet which extends in the lubricant passage (7) and protrudes from the same and opens the valve (12) by being depressed into the lubricant passage (7).

20. An actuator for adjusting the pitch angle of a rotor blade (2) of a wind turbine (3), which is rotatably mounted on a rotor hub (1), comprising a first drive element (4) connectable with the rotor blade (2), a second drive element (5) in meshing engagement with said first drive element (4), as well as a lubricating device (6) for lubricating the two drive elements (4, 5), characterized in that the lubricating device (6) has a lubricant passage (7) for the selective supply of lubricant to the portion (8) of the first drive element (4) and/or the portion (9) of the second drive element (5), which are in engagement with each other when the rotor blade (2) is in its preferred working position, and a supply control means (10) for controlling the supply of lubricant through said lubricant passage (7) in dependence on the engagement position of the two drive elements (4, 5);

wherein the first drive element (4) forms a bearing ring of a rotary bearing (20), by means of which the rotor blade (2) can be supported on the rotor hub (1), where in particular the first drive element (4) forms the inner ring of the rotary bearing (20) and has an internal toothing with which meshes the second drive element (5).

21. The actuator as claimed in claim 20, wherein the second drive element (5) is seated on a drive shaft which is connectable with an actuator motor (21) and/or forms the motor shaft thereof.

22. A wind turbine comprising a rotor (23) as claimed in claim 21.

* * * * *